United States Patent [19]

Billiet

[11] Patent Number: 4,537,748

[45] Date of Patent: Aug. 27, 1985

[54] APPARATUS FOR TREATING COMPRESSED AIR FOR BREATHING PURPOSES

[75] Inventor: Colin T. Billiet, Durham, England

[73] Assignee: Domnick Hunter Filters Ltd., Durham, England

[21] Appl. No.: 416,306

[22] Filed: Sep. 9, 1982

[30] Foreign Application Priority Data

Sep. 11, 1981 [GB] United Kingdom ............... 81127557

[51] Int. Cl.$^3$ .............................................. A62B 7/08
[52] U.S. Cl. ................................ 422/122; 128/202.22; 128/204.17; 128/205.28; 128/205.29; 422/109; 422/119; 422/120; 422/190
[58] Field of Search .................. 422/4, 105, 109, 116, 422/119, 122, 169, 174, 176, 177, 220; 128/202.22, 204.11, 204.17, 205.27, 205.28, 205.29; 219/505

[56] References Cited

U.S. PATENT DOCUMENTS

| 3,457,040 | 7/1969 | Jennings ........................... 422/122 X |
| 3,490,878 | 1/1970 | Russell ............................. 422/122 X |
| 3,654,432 | 4/1972 | Dyre ................................... 422/4 X |
| 3,672,824 | 6/1972 | Tamura et al. . |
| 3,706,535 | 12/1972 | Taylor et al. ....................... 422/105 |
| 3,959,621 | 5/1976 | Nakata ................................. 219/501 |
| 4,003,979 | 1/1977 | Kanno ................................. 423/239 |
| 4,054,428 | 10/1977 | Foltz ................................. 422/190 X |
| 4,084,655 | 5/1978 | Razete ................................. 422/120 |
| 4,104,507 | 8/1978 | Tisone et al. ................... 219/505 X |
| 4,162,430 | 7/1979 | Cadoff et al. ................. 315/DIG. 5 |
| 4,448,757 | 5/1984 | Barnwell et al. ................ 422/122 X |

FOREIGN PATENT DOCUMENTS

| 0002791 | 7/1979 | European Pat. Off. . |
| 1213252 | 3/1966 | Fed. Rep. of Germany ....................... 128/205.27 |
| 2204542 | 8/1973 | Fed. Rep. of Germany . |
| 2455681 | 6/1975 | Fed. Rep. of Germany . |
| 2383670 | 10/1978 | France . |
| 0494098 | 10/1938 | United Kingdom . |
| 0894612 | 4/1962 | United Kingdom . |
| 0929939 | 6/1963 | United Kingdom . |
| 0937293 | 9/1963 | United Kingdom . |
| 1545870 | 5/1979 | United Kingdom . |
| 2021435 | 12/1979 | United Kingdom . |
| 1573878 | 8/1980 | United Kingdom . |

Primary Examiner—Barry S. Richman
Assistant Examiner—Brion P. Heaney
Attorney, Agent, or Firm—Bert J. Lewen

[57] ABSTRACT

Apparatus for treating a supply of compressed air containing carbon monoxide but substantially devoid of free water and of relative humidity sufficient for comfortable breathing, to render it suitable for breathing purposes. The apparatus comprises four sequential filters for preliminary removal of bulk liquids, particulates, carbon dioxide, oil and water aerosols, and hydrocarbon vapors and odors and a pressure vessel (21) having a heater (39) at its inlet to which the air is supplied without any drying treatment. The heater comprises at least one heating element formed of a material which exhibits a rapid increase in electrical resistance at a temperature of from 101° C. to 110° C. From the heater the air passes to and through a bed of granular catalyst material within the pressure vessel, the catalyst oxidising CO in the air to $CO_2$. A temperature sensor (37) within or immediately downstream of the catalyst bed controls the heater to maintain a mean bed temperature of not less than 100° C. during air passage therethrough, so effecting a temperature change in the water vapour in the air to avoid poisoning of the catalyst. The air passing from the bed is delivered cooled, but not further treated, for breathing purposes.

16 Claims, 3 Drawing Figures

APPARATUS FOR TREATING COMPRESSED AIR FOR BREATHING PURPOSES

This invention relates to apparatus for treating a supply of compressed air to render it suitable for breathing purposes.

The provision of air suitable for breathing purposes is stringently controlled by specifications that lay down high standards of purity for the delivered air. Meeting these specifications can be a matter of extreme difficulty, particularly when the treatment apparatus is required for use in difficult sites, and also when account is taken of the possible mis-siting of compressor air intake vents, accidental environmental pollution, compressor malfunction or any other event which could lead to pollutant levels higher than normal in the intake air.

Existing filtration techniques can effectively deal with removal of oil and water aerosols, oil vapour, odours and dirt, and adequate levels of purity as regards these contaminants can readily be reached. However, a further requirement is that toxic gases be removed from the air before delivery for breathing purposes, a particular problem arising in connection with the removal of carbon monoxide.

Removal of carbon monoxide gas from a pre-filtered air stream can be achieved in known manner by oxidation through chemisorption and catalysis, using the hopcalite type of catalyst consisting of manganese dioxide as the main component mixed with the oxide of a metal such as copper, iron, cobalt or silver. Such catalysts are readily poisoned by water or water vapour in the airstream and are rapidly rendered inefficient by a wet or humid airstream. It has been found that pre-drying of the air to a dew point of less than $-60°$ C. is normally required in order to obtain a useful working life from a catalyst bed of this nature.

Compressed atmospheric air, even after prefiltration to remove free water, inevitably contains significant levels of water vapour. Current practice, therefore, is to pass the air through large dessicant beds in order to dry the air prior to passage thereof through the catalyst bed. Breathing air is commonly treated and provided at air pressures up to 16 bar gauge and the high volumetric flows that are required, coupled with the relatively large quantity of water vapour that is present in atmospheric air mean that dessicant units exhibit high pressure drops across them and tend to be both inefficient and bulky. Furthermore, after treatment in the dessicant bed and passage through the catalyst bed the air is generally too dry for comfortable breathing and after the pressure drop on returning to atmospheric pressure is generally too cold for comfortable breathing. Accordingly, the air is commonly re-humidified and warmed prior to delivery.

The object of the invention is to overcome the above-mentioned disadvantages of the prior art systems and to provide a compact carbon monoxide removal unit that may be used either alone in the treatment of pre-filtered air, for example from a ring main system, or as part of a complete filtration unit receiving a supply of contaminated compressed air direct from a compressor.

According to a first aspect of the present invention an apparatus for treating a supply of compressed air containing carbon monoxide but substantially devoid of water aerosol and having relative humidity sufficient for comfortable breathing, in order to render it suitable for breathing purposes, comprises a pressure vessel having an inlet at which said supply is received, a heater, means for directing the humid air, without any drying treatment, over the heater and thence to and through a bed of granular catalyst material within the pressure vessel, the catalyst material being effective to cause oxidation of the carbon monoxide in the air to carbon dioxide, a temperature sensor within or immediately downstream of the catalyst bed, control means responsive to the sensor to cause operation of the heater to maintain a mean bed temperature of not less than 100° C. during air passage therethrough, and means for delivering the air from the catalyst bed, cooled, but not further treated, for breathing purposes.

It will be seen that in the apparatus of the invention the carbon monoxide oxidation catalyst is protected by raising the air temperature passing over the catalyst to a figure such that the mean bed temperature of the catalyst is not less than 100° C. This heating of the incoming humid air in advance of the catalyst raises the temperature of the catalyst which prevents adsorption of the water vapour by the catalyst. The catalytic action is that of a true catalyst and hence the theoretical efficiency of the catalyst is unimpaired during use.

The invention provides numerous advantages. There is no requirement for dessicant beds or for complex regenerative systems such as were used in the prior art. The temperature change in the incoming air is localised to the region of the catalyst bed, the relative humidity increasing as the air leaving the bed cools. Thus, no further treatment is needed in order to re-humidify the air prior to breathing, again in contrast to prior art systems. By proper design of pipe-work downstream of the catalyst bed the air may be cooled to a comfortable breathing temperature and delivered at that temperature without further energy input, i.e. without other external heating means. Passage of the air through the catalyst bed provides a tortuous path for viable organisms carried within the air, the high temperature of the bed resulting in the destruction of such organisms so that the downstream is also substantially aseptically pure.

As aforesaid the apparatus is suitable for treating a supply of air that is substantially devoid of water aerosol. If water aerosol is present it is unlikely that the heater can effect, in the available time, temperature changes of the water aerosol and heating of the water vapour sufficient to avoid poisoning of the catalyst. A supply of compressed air free of water aerosol may be provided to the apparatus in a number of ways, the commonest of which may be a ring main from a central compressor and filtration unit. However, it is desirable that the carbon monoxide removal unit is incorporated as part of a complete filtration unit capable of receiving a supply of contaminated compressed air direct from a compressor and delivering air that is suitable for breathing.

Thus, from another aspect of the invention, an apparatus for treating a supply of humid, contaminated compressed air received direct from a compressor to render it suitable for breathing purposes comprises a first filter for removing bulk liquids and gross particulate matter; a second filter comprising a soda lime adsorption bed for removing carbon dioxide and acidic fumes; a third coalescing filter for removing oil and water aerosols and sub-micron particulate matter; means for directing the air sequentially through the first, second and third filters to deliver from the third filter a filtered air supply substantially devoid of water aerosol; a pressure vessel having an inlet at which said supply is received; a heater; means for directing the supply of humid air, without any drying treatment, over the heater and thence to and through a bed of granular catalyst material within the pressure vessel, the catalyst material being effective to cause oxidation of carbon monoxide in the air to carbon dioxide; a temperature sensor within or immediately downstream of the catalyst bed; control means responsive to the sensor to cause operation of the heater to maintain a mean bed temperature of not less than 100° C. during passage therethrough; and means for delivering the air from the catalyst bed, cooled, but not further treated, for breathing purposes.

The filters and the pressure vessel may then be contained in a common cabinet having an inlet for connection to a compressor and an outlet for connection to a breathing air supply line. The cabinet may also contain a fourth filter comprising an activated carbon adsorption bed for removal of hydrocarbon vapours and odours the air supply passing from the fourth filter to the heater and then to the catalyst bed without any further treatment.

As already stated the temperature sensor is located within or, preferably, immediately downstream of the catalyst bed and it effects control of the heating means so that the temperature of the air passing through the catalyst bed maintains the bed at a mean temperature of not less than 100° C. Thus, the sensor effects control of the heating means so that heat input is reduced when the sensor detects a preset maximum temperature and is increased when the sensor detects a preset minimum temperature. In practice the sensor may be a control thermistor set at 100° C. and switching at plus or minus 1° C. Temperature settings somewhat in excess of 100° C. are, of course, possible and the switching range may be greater than that set forth, although the sensor should always be such that the heater is switched on if the sensor temperature falls to 95° C., more preferably 98° C.

Heating of the air prior to passage through the catalyst may be effected in any one of a number of ways. Preferably, however, the pressure vessel comprises a housing having an inlet and an outlet, the heater is located in the housing adjacent to the inlet thereof, and a canister containing the granular catalyst material is removably retained within the housing in a location such that an inlet into the canister is immediately downstream of the heater and an outlet from the canister communicates with the outlet from the housing. Thus, the heater and catalyst bed are combined together in a single compact unit.

The heater desirably comprises at least one heating element removably located within the housing adjacent to the inlet thereof and extending across the air passage from the inlet to the catalyst bed. It is particularly preferred to use for the heating element a semi-conductor ceramic material that exhibits a rapid increase in electrical resistance at a temperature of from 101° C. to 110° C. Use of such a heating element in conjunction with the sensor located as aforesaid leads to excellent temperature control and economy of power consumption.

In order that the invention may be better understood a unit for treating a supply of humid, contaminated compressed air received direct from a compressor will now be described in more detail, by way of example only, with reference to the accompanying drawings in which.

Figure 1:
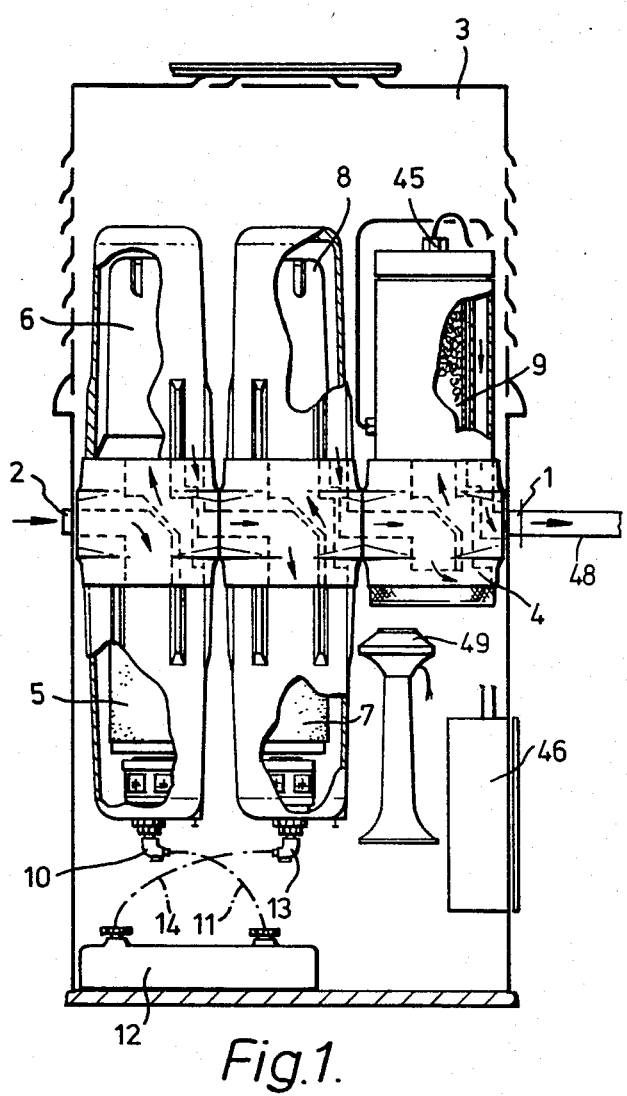
FIG. 1 is a schematic elevation of the unit.

Referring now to FIG. 1 this shows a unit suitable for providing air for breathing from an outlet 1, the unit being supplied at an inlet 2 with humid, contaminated compressed air, received direct from a compressor, at pressures of up to 16 bar gauge and above. The unit comprises a casing 3 in which there is a central manifold 4 incorporating appropriate air flow passages (shown in broken outline) and providing mountings for releasably mounting in a sealing manner a plurality of filter units 5 to 9. Air flows sequentially through these units in the order generally indicated by the arrows.

The first filter 5 is a general purpose filter of any suitable construction that is capable of removing from the incoming air bulk liquids and gross particulate matter down to a size of one micron. The filter is shown in FIG. 1 as incorporating a cylindrical filter element, with air flowing radially from the inside to the outside of the element and liquids collected by the filter draining by way of a connection 10 and pipe 11 into a collection bottle 12.

The filter air delivered from the filter 5 then passes through the manifold and into the filter 6, which comprises a chamber containing a bed of granular soda lime filled to its maximum packing density and allowing no granular movement, so achieving maximum contact with the airstream. The filter 5 removes the bulk particulate and oil and water contamination that would normally blind up a soda lime bed, but allows water vapour and sub-micron aerosol material to pass through into the soda lime bed, so allowing filter 6 to operate to adsorb carbon dioxide and acidic fumes that may be present in the air.

From the filter 6 the air passes through the manifold and into the filter 7, which is a high efficiency coalescing filter of any suitable construction effective to remove oil/water aerosols and particulate matter down to sub-micron level, typically 0.01 microns. Again the filter element is shown as cylindrical with air flowing radially from the inside to the outside of the element, and, as with the filter 5, liquids collected by the filter may drain therefrom by way of a connection 13 and pipe 14 into the collecting bottle 12.

From the filter 7 the air passes through the manifold and into the filter 8 which includes a bed of activated carbon in finely granulated form to offer as large a surface area as possible in order that adsorption of hydrocarbon vapours and odours from the air may occur. The bed depth is designed to give maximum contact time between the air and the activated carbon.

The filters 6 and 8 may also be of conventional construction. In one convenient form the adsorption beds in the two filters are each bound by a vacuum formed tube of randomly orientated glass microfibres bonded by resin and heat treated to obtain high strength and rigidity whilst presenting low resistivity to air flow through the tube. The tube itself is located in a housing that is preferably moulded from clear polycarbonate, the housing being ultrasonically sealed to ensure integrity of the filter elements. The design of each of the four filters 5 to 8 that make up the pre-filtering stages is such that there is no bypass of unfiltered air through any individual filter, so avoiding downstream contamination of the air. Each filter is mounted by threaded engagement on the manifold, with sealing rings located between the filter inlets and outlets and the flow passages in the manifold.

Figure 2:
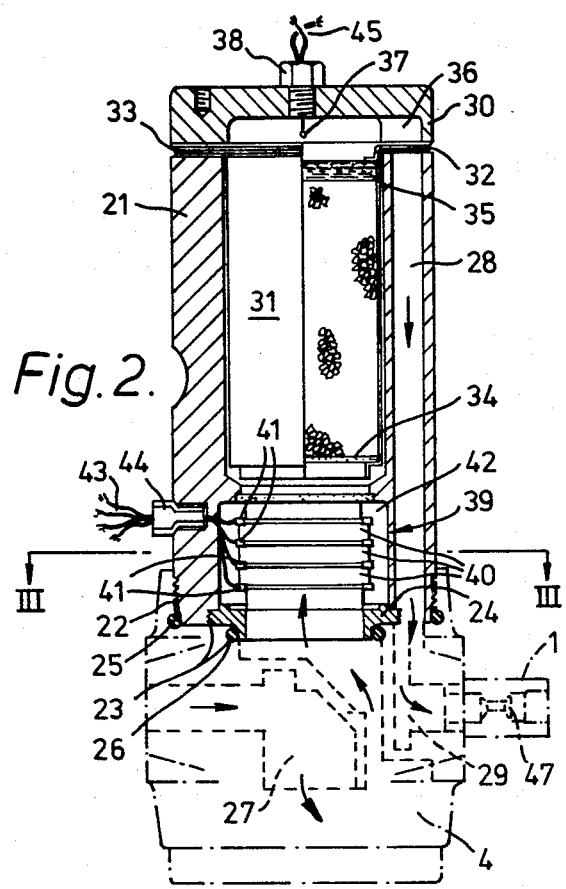
FIG. 2 is an enlarged detail of a catalytic carbon monoxide filter incorporated within the unit.
Figure 3:
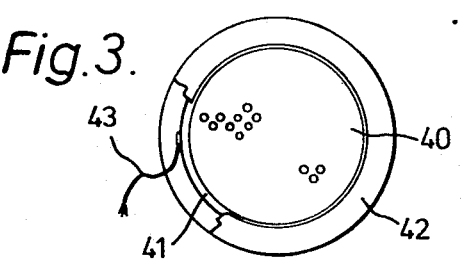
FIG. 3 is a partial cross-section on the line III—III of FIG. 2.

The pre-filtered air delivered from the filter 8 then passes into the filter 9 designed to effect removal of carbon monoxide (and of $NO_x$ gases that may be present), this filter being shown in more detail in FIG. 2.

The filter 9 comprises a pressure vessel housing 21, that may be example be of aluminium or suitable polymeric material. The lower end of the housing has an externally threaded section 22 by way of which the housing may be threaded into the manifold 4. Part of this section is also internally threaded at 23 and an inlet member 24 is screwed into this section. Sealing rings 25 and 26 cooperate with the manifold to seal the inlet 24 in communication with an air inlet passage 27 through the manifold and to seal an outlet 28 from the filter to an outlet passage 29 in the manifold. The upper part of the pressure vessel housing 21 is closed by an end cap 30 secured to the housing by cap screws and sealed by a gasket 33.

A filter canister containing tightly packed granular hopcalite catalyst is removably retained within the housing by the end cap 30. The canister 31 has a flange 32 which, together with the gasket 33, is trapped between the facing axial surfaces of the end cap 30 and the housing 21. The canister incorporates a sintered bronze disc 34 at the air inlet end in order evenly to diffuse incoming air and to prevent the catalyst granules from escaping from the bottom of the canister. A microfibre disc 35 is located at the air outlet end of the canister, again to prevent escape of catalyst granules. Air leaves the canister through this disc into a chamber 36 within the end cap and passes from there to the outlet 28 from the housing. A control thermistor 37 is secured on the end cap by a threaded carrier 38 to be located within the chamber 36 immediately downstream of the catalyst material.

Below the canister 31, at the inlet end of the housing 21, there is provided a heater shown generally as 39. The heater consists of three heating elements 40, each in the form of a disc extending across the air passage from the inlet 24 to the canister 31. Each disc is formed with hexagonal holes, somewhat in the manner of a honeycomb. Each disc is formed from a semi-conductor ceramic material, for example doped barium titanate, that exhibits a rapid increase in electrical resistance at a temperature of from 101° C. to 110° C. The flat surfaces of each disc are coated with electrode material which is in contact with copper ring electrodes 41 lying between the discs at the outer peripheries of the opposing surfaces of the discs. The discs and electrodes are encapsulated as a unit into a silicone rubber mount 42 which is both electrically and heat resistant and which fits into the inlet end of the housing. Electrical leads 43 to the encapsulated discs pass through a pressure sealing gland 44 in the side wall of the housing 21.

The thermistor 37 is connected by electrical leads 45 to a control unit 46, to which is also connected the heater supply cables 43, and an external power source. The control unit includes an external proportional temperature control circuit responsive to the thermistor and controlling the supply of power to the heating elements as the system demands. The heating elements are wired in parallel. The ceramic material of each heating element is chosen for the property of relatively low electrical resistance up to a given temperature, known as the switching temperature, at which there is a very rapid increase in block resistance. Thus, switching on an electrical supply to the block produces high current so that the block self-heats rapidly to its switching temperature, at which temperature the resistance rapidly increases so decreasing the input power to the block. Subsequent heat losses will cool the block resulting in the reaching of an equilibrium temperature where the heat generated by the input power to the block is equal to heat losses from the block. The particular ceramic material chosen for the block is selected so that the switching temperature of the block is in excess of 100° C., for example from 101° C. to 110° C. Used in conjunction with a control thermistor set at 100° C. and normally actuating at plus or minus 1° C. this gives very accurate heating control.

In use, a flow of compressed air is established through the unit, the air being pre-filtered in filters 5 to 8 and passing therefrom into the filter 9. The electrical supply to the heater 39 is switched on, resulting in the heater rapidly attaining the required temperature, so heating the air passing over the filter. The air in turn heats the catalyst bed and from start up this heating continues until the thermistor 37 reaches its actuating maximum temperature of, for example 101° C. During this heating operation the heater has been stabilising its operation according to the control of the sensor in response to air flow variations and heat losses through the housing.

If the air throughput is materially increased then cooling of the catalyst bed will result; similarly cooling may be caused by a fall in ambient temperature of the unit. The thermistor monitors the temperature of air leaving the bed and if this falls to a minimum value of, say, 99° C. then the current supply to the heater is switched on so that this again commences to heat the incoming air and reach a stable condition according to the setting of the sensor. Use of a semi-conductor ceramic heating element in conjunction with the thermistor provides very accurate control of the mean bed temperature.

Thus, operation will take place with the catalyst bed held at a temperature of 100° C.±1° C., thereby preventing adsorption of water vapour by the catalyst. The oxidising effect of the catalyst is thus unhindered. Air leaving the filter 9 is accordingly free of carbon monoxide, and is moreover substantially aseptic, most if not all viable organisms present in the air having been destroyed by the elevated temperature. As the air leaving the filter cools, the relative humidity increases so resulting in a desirable level of humidity in the air. Furthermore, as the air is fed from the unit to the point of use it gradually cools during its flow through connecting lines 48 and at the point of use undergoes further cooling on expansion as the pressure reduces from the relatively high delivery pressure to the region of atmospheric pressure. The supply connections from the unit can readily be designed to ensure a comfortable breathing temperature at the point of use.

The apparatus may conveniently include a number of safety features. The outlet 1 from the apparatus desirably includes a restricting orifice 47 designed to limit the air flow from the unit to a maximum level. This is set so that the passage time of the air through the various filter elements is sufficient to ensure that effective filtration, and particularly full conversion of carbon monoxide to carbon dioxide, occurs. It is desirable that air should not flow through the unit in the absence of electrical power to the heater. An air bleed from the manifold is therefore desirably taken to a normally open, solenoid controlled valve at the inlet to an air horn 49.

The supply of electrical power to the unit closes the valve thereby preventing passage of air through the horn, but if electrical power is not present then the valve opens and an audible warning is accordingly given.

The use of the semi-conductor ceramic heating elements described leads to a very rapid heating of the air and thus the catalyst bed to its operating temperature. Clearly this is desirable to minimise initial poisoning of the catalyst before the operating temperature is reached and to ensure that breathable air is supplied as soon as possible after commencement of operation. If the said temperature does not reach 100° C. within a short time from start up, then a possible fault has developed and operation should not continue. Accordingly, the control unit 46 may include a timing circuit which switches off the power supply and operates an alarm system after a given time from start up and which is overridden only if within that time the sensor indicates that a temperature of 100° C. has been reached.

It will be understood that many changes may be made to the particular form of apparatus that is shown in the drawings. For example the unit may be provided with any required combination of pre-filtering stages and it may be designed so that it may readily be used in any selected environment.

I claim:

1. Apparatus for treating a supply of humid contaminated compressed air to render it suitable for breathing purposes, the apparatus comprising: inlet means for receiving compressed air directly from a compressor; a first filter for removing bulk liquids and gross particulate matter; a second filter comprising a soda lime adsorption bed for removing carbon dioxide and acidic fumes; a third coalescing filter for removing oil and water aerosols and sub-micron particulate matter; a fourth filter comprising an activated carbon adsorption bed for removal of hydrocarbon vapors and odors; means for directing the air sequentially through the first, second, third and fourth filters to deliver from the fourth filter a filtered humid air supply substantially devoid of water aerosol; a pressure vessel having an inlet at which said filtered humid air supply is received from said fourth filter via said air delivery means; a bed of granular catalyst material within the pressure vessel, the catalyst material being effective to cause oxidation of carbon monoxide in the air to carbon dioxide; an air passage from the inlet to the catalyst bed; a heater comprising at least one heating element extending within the air passage, the heating element being formed of a material that exhibits a rapid increase in electrical resistance at a temperature of from 101° C. to 110° C.; means for supplying electrical current to the heating element; a temperature sensor immediately downstream of the catalyst bed; control means connected to the sensor and the heater whereby the control means is responsive to the sensor to cause operation of the heater so as to maintain a mean catalyst bed temperature of not less than 100° C. during air passage therethrough; and outlet means within said pressure vessel located downstream of the catalyst bed for passing the relatively high pressure and temperature air from the catalyst bed and out of said pressure vessel, said air, upon cooling and expansion to atmospheric pressure, being suitable for breathing purposes.

2. Apparatus according to claim 1 further comprising an alarm means operable to indicate the supply of compressed air to the apparatus when the heater is not operative.

3. Apparatus according to claim 1 further comprising an alarm system to indicate that the temperature sensor has not sensed a temperature of 100° C. within a given time from initiation of operation of the heater.

4. Apparatus according to claim 1 further comprising an air flow restricting means downstream of the catalyst bed.

5. Apparatus according to claim 1 in which the heating element is removably located within the pressure vessel.

6. Apparatus according to claim 5 in which the heating element is a disc extending across the whole cross-sectional area of said air passage and the disc is formed with air flow openings therethrough.

7. Apparatus according to claim 5 in which the heating element is made of a semiconductor ceramic material.

8. Apparatus according to claim 5 in which the heating element is supported within the pressure vessel by a mount of a heat and electrical insulating material.

9. Apparatus according to claim 5 in which electrical connections to the heating element pass through a pressure resistant gland in the pressure vessel.

10. Apparatus according to claim 1 in which the pressure vessel comprises a canister having a canister inlet and a canister outlet, the canister containing the bed of granular catalyst material and retaining means removably retaining the canister within said pressure vessel in a location such that said canister inlet is immediately downstream of the heater and said canister outlet communicates with said outlet means from said pressure vessel.

11. Apparatus according to claim 10 in which the retaining means comprises a removable end cap at the end of said pressure vessel opposite to the heater, the end cap serving to retain the canister within the pressure vessel.

12. Apparatus according to claim 11 in which the temperature sensor is carried by the end cap.

13. Apparatus according to claim 1 in which all the filters and the pressure vessel are contained in a common cabinet having an inlet for connection to a compressor and an outlet for connection to a breathing air supply line.

14. Apparatus according to claim 13 in which each of the filters has an inlet and an outlet and these, together with the inlet and outlet means of the pressure vessel, communicate with respective separate air flow passages in a manifold means on which the filters and the pressure vessel are mounted.

15. Apparatus according to claim 14, in which the manifold means is aligned generally horizontally, the second filter, fourth filter and pressure vessel extend vertically above the manifold means, the first and third filters extend vertically below the manifold means and drain connections are provided from the first and third filters to a drain tank within the cabinet.

16. Apparatus according to claim 14 wherein the pressure vessel has means thereon for securing said pressure vessel to said manifold means, said securing means being located adjacent said heater.

* * * * *